(12) United States Patent
Blum et al.

(10) Patent No.: US 7,853,200 B2
(45) Date of Patent: *Dec. 14, 2010

(54) USING CALLER ID FOR SERVICE BASED TWO-WAY VOICE HYBRID DATA AND VOICE REPORTING

(75) Inventors: William R. Blum, Huntington Station, NY (US); Christopher E. Beach, West Islip, NY (US); Chris Coleman, Centereach, NY (US)

(73) Assignee: Honeywell International Inc., Morristown, NJ (US)

( * ) Notice: Subject to any disclaimer, the term of this patent is extended or adjusted under 35 U.S.C. 154(b) by 380 days.

This patent is subject to a terminal disclaimer.

(21) Appl. No.: 12/110,883

(22) Filed: Apr. 28, 2008

(65) Prior Publication Data

US 2009/0325559 A1    Dec. 31, 2009

(51) Int. Cl.
*H04H 20/71* (2008.01)
(52) U.S. Cl. .................. 455/3.05; 455/412.2; 455/416; 455/419; 455/422.1; 370/260; 379/39; 379/45; 379/51; 379/102.02; 340/506; 340/539.16
(58) Field of Classification Search ................ 455/3.05, 455/3.03, 412.2, 414.1, 415, 416, 417, 418, 455/419, 420, 422.1; 370/260; 379/37–45, 379/49, 51, 102.02, 102.03, 111.01; 340/506, 340/539.11, 539.16, 539.17, 539.18
See application file for complete search history.

(56) References Cited

U.S. PATENT DOCUMENTS

| 4,253,157 | A | * | 2/1981 | Kirschner et al. ................ 1/1 |
| 5,568,121 | A | | 10/1996 | Lamensdorf |
| 5,568,535 | A | * | 10/1996 | Sheffer et al. ................ 379/39 |
| 5,815,550 | A | * | 9/1998 | Miller .......................... 379/37 |
| 6,040,770 | A | * | 3/2000 | Britton .................. 340/539.24 |
| 6,542,072 | B1 | | 4/2003 | Yang |
| 7,391,315 | B2 | * | 6/2008 | Friar ........................... 340/506 |
| 2004/0086093 | A1 | | 5/2004 | Schranz |
| 2007/0086578 | A1 | * | 4/2007 | Hansen et al. ................ 379/45 |

FOREIGN PATENT DOCUMENTS

| DE | 4444653 A1 | 6/1996 |
| WO | WO 9858494 A2 | 12/1998 |
| WO | WO 0100085 A1 | 1/2001 |
| WO | WO 2006137099 A2 | 4/2006 |

* cited by examiner

*Primary Examiner*—Matthew D Anderson
*Assistant Examiner*—Shaima Q Aminzay
(74) *Attorney, Agent, or Firm*—Husch Blackwell Welsh Katz

(57) ABSTRACT

A method is presented for providing alarm notification and two-way voice communication for a hybrid data/voice system. In one embodiment, the method comprises sending an alarm notification from a communication device to an alarm forwarding service, recognizing an ID of the communication device, using said ID to create a three-way call among the alarm forwarding service, the communication device and a central station, and initiating a two-way voice communication between said communication device and the central station. In another embodiment, the method comprises sending an alarm notification from a communication device to an alarm forwarding service, establishing a connection from said alarm forwarding service to said communication device, using said connection to create a three-way call among the alarm forwarding service, the communication device and a central station, and initiating a two-way voice communication between the communication device and the central station.

12 Claims, 4 Drawing Sheets

USING CALLER ID FOR SERVICE BASED TWO-WAY VOICE HYBRID DATA AND VOICE REPORTING

CROSS REFERENCE TO RELATED APPLICATION

This application is related to commonly-owned, co-pending U.S. patent application Ser. No. 11/834,414 filed on Aug. 6, 2007, the entire contents and disclosure of which is expressly incorporated by reference as if fully set forth herein.

FIELD OF THE INVENTION

The present invention relates generally to alarm signaling. In particular, the invention relates to alarm signaling with hybrid data and two-way voice channeling.

BACKGROUND OF THE INVENTION

Alarm and security systems generally signal alarm conditions by contacting a central station upon the occurrence of a predetermined condition such as an intrusion or break-in on a premise under surveillance. Alarm signals are typically digital data signals that are sent over a telephone line from the premises to the central station where actions may be taken such as dispatching local police. In certain cases, in response to an alarm signal, it is desired to initiate a two-way voice telephone call to confirm if a request for police dispatch or other event(s) should be initiated. Hence, if an alarm signal is transmitted from a home to the central station, an operator at the central station may attempt to initiate a voice conversation with the homeowner to ascertain if there is genuinely a trouble condition. The operator would request that the homeowner pronounce a code confirmation into a two-way speakerphone panel located in the home. If the homeowner does not respond with the expected code, or if other problems are apparent through the voice connection, then the operator may make the decision to initiate an event, such as to inform and/or dispatch the local police, private security personnel, firefighters, or others. This two-way voice feature helps reduce false alarms and increases speed of response, among other things.

While this type of service is employed with POTS (plain old telephone system) lines, the use of cellular telephone systems causes new problems in this area, because the alarm signals that must be sent as digital data signals are not successfully transmitted over the voice channel of the cellular network due, for example, to the CODECs (coder-decoders) used by the cellular network. That is, while digitized voice signals can be acceptably transmitted over a cellular network, the digital data used for the alarm signal prior to the two-way voice conversation is not transmitted with acceptable fidelity. Hence an alarm signal must be transmitted over a data channel or data connection of a cellular network. Thus, the techniques employed by traditional systems, such as POTS, to associate the digital data alarm signals with the resulting two-way voice telephone call do not successfully operate with the current cellular networks. Moreover, some carriers, or cellular network operators, limit mobile originated calls regarding security system issues to a single outbound number or "hot line". Consequently, a system and/or method that associates an incoming alarm signal with a particular voice channel or telephone line over which voice communication can be performed is needed.

SUMMARY OF THE INVENTION

The present invention advantageously provides a method for providing alarm notification and two-way voice communication for a hybrid data/voice system. In one embodiment, the method comprises sending an alarm notification from a remote communication device to an alarm forwarding service, recognizing an ID of the remote communication device, using said ID to create a three-way call among the alarm forwarding service, the remote communication device and a central station, and initiating a two-way voice communication between said remote communication device and the central station.

In another embodiment, the method comprises sending an alarm notification from a remote communication device to an alarm forwarding service, establishing a connection from said alarm forwarding service to said remote communication device, using said connection to create a three-way call among the alarm forwarding service, the remote communication device and a central station, and initiating a two-way voice communication between the remote communication device and the central station.

BRIEF DESCRIPTION OF THE DRAWING

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

The foregoing and other objects, aspects, features, advantages of the invention will become more apparent from the following description and from the claims.

DISCLOSURE OF THE INVENTION

Figure 1:
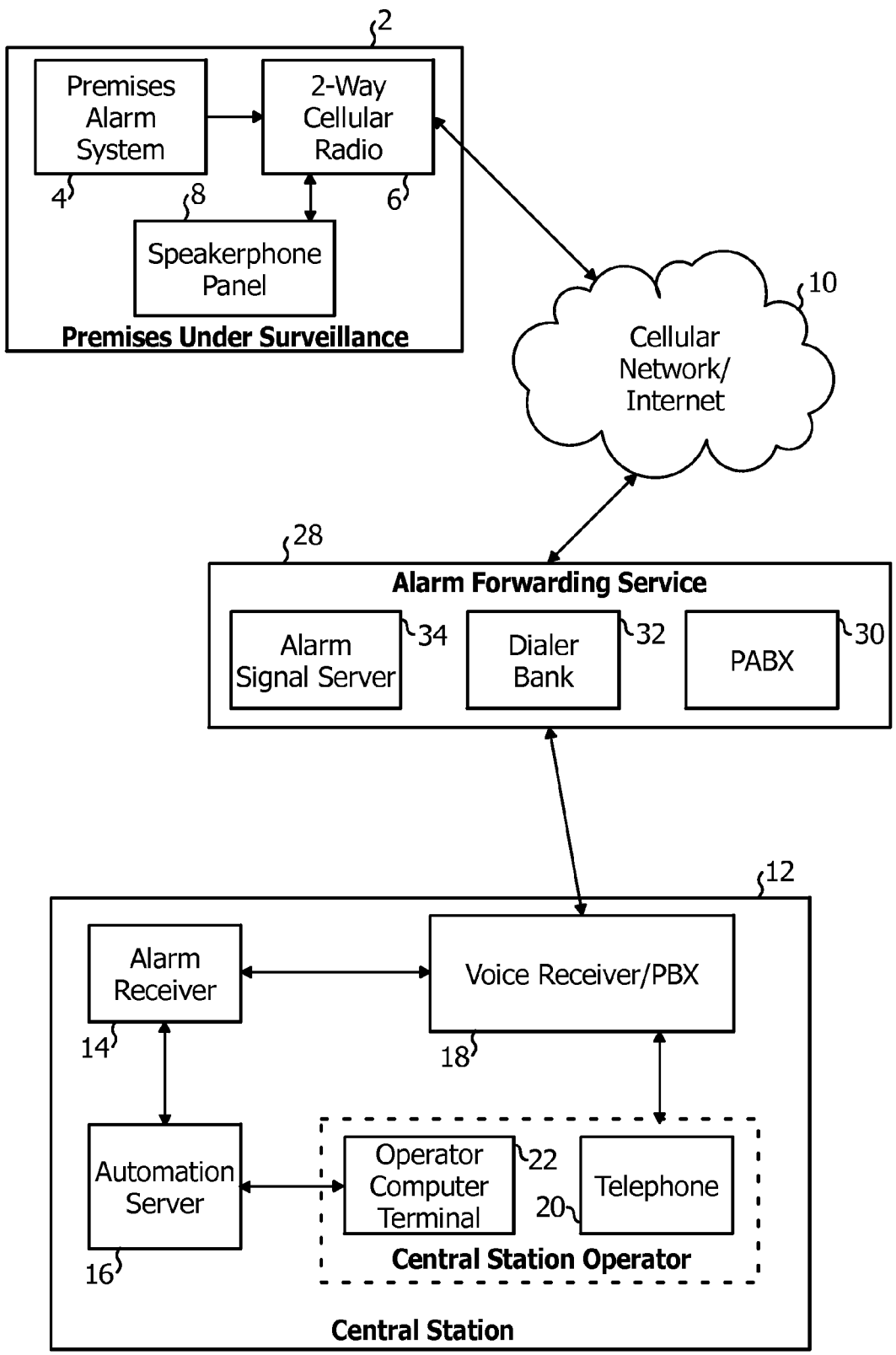
FIG. 1 is a block diagram of the first embodiment of the present invention.
Figure 2:
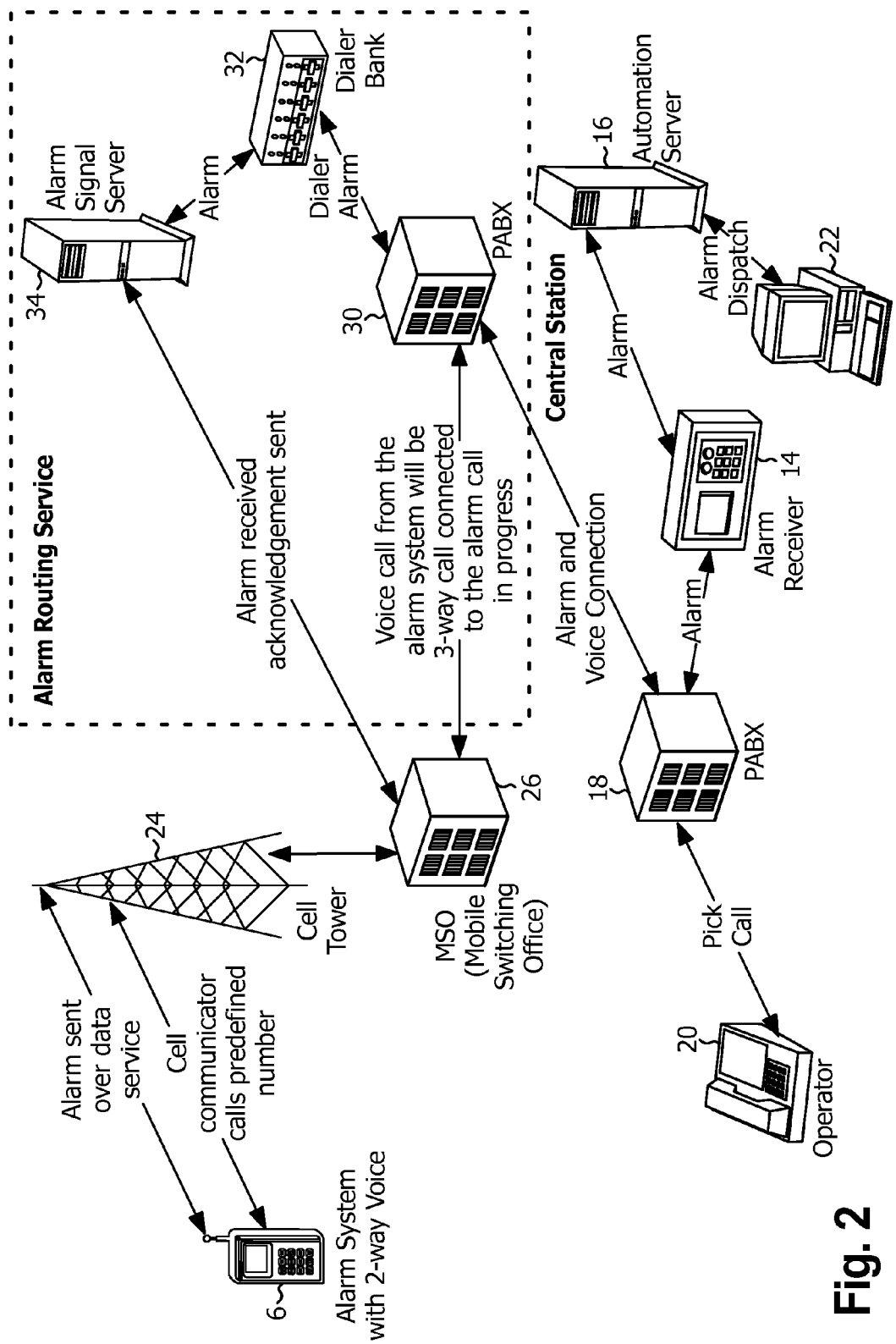
FIG. 2 is a schematic illustration of the first embodiment of the present invention.
Figure 3:
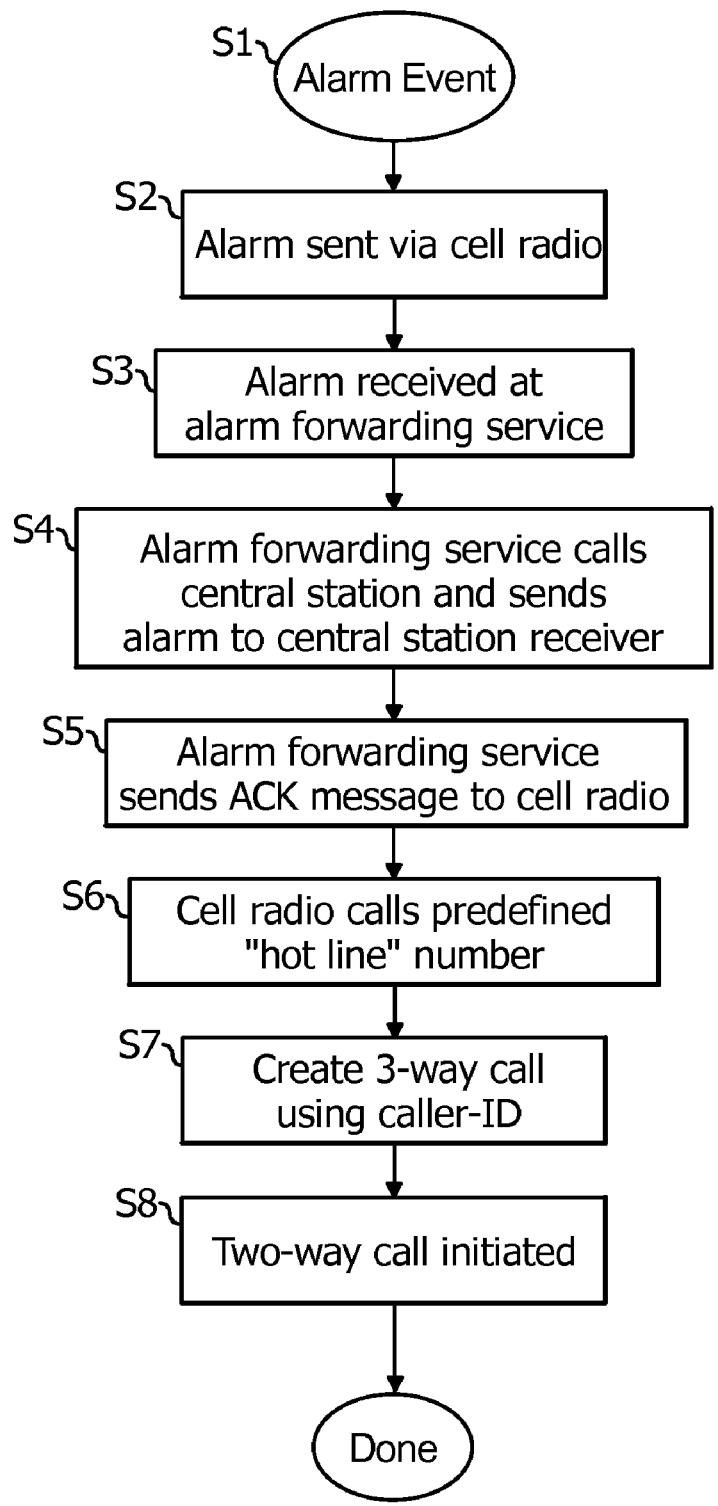
FIG. 3 is a flowchart of the steps carried out by the first embodiment of the present invention.

The first embodiment of the inventive system is shown in the block diagram of FIG. 1 and the schematic illustration of FIG. 2. The procedures of this first embodiment are shown in the flowchart of FIG. 3. The inventive system includes a building 2, that is the premises under surveillance, which includes an alarm system 4, a 2-way remote communication device such as a cellular radio 6, and a speakerphone panel 8. Also in the system is a central station 28 that includes an automated server 16, a PBX 18, a central station operator having an operator computer terminal 22 and a telephone device 20, and an alarm receiver 14. The system further includes an alarm forwarding service 28 having an alarm signal server 34, a PABX 30 and a dialer bank 32.

When an alarm event is detected by the alarm system 4 (such as a door opening when the alarm system 4 is armed and the disarm code is not entered on a security system keypad within a predetermined time), then an alarm signal is generated as is well known in the art. This digital alarm signal along with alarm data will be transmitted by the cellular radio 6 via a digital data service implemented by the cellular network 10, such as SMS (short message service or text message), GPRS (General Packet Radio Service), 1XRTT, or any other digital data transmission service or data communication method, including internet protocol (IP). The cellular network 10 can include a cell tower 24 and mobile switching office 26, as shown in FIG. 2. The transmission can be over the cellular network 10. Optionally, the data is transmitted using internet protocol, and the cellular radio voice connection is replaced by a VOIP-enabled communication device. The digital alarm signal and alarm data will be referred to as an alarm message, and it is understood that any digital data protocol may be used. Similarly, it is understood that cellular network 10 can be any data or voice transmission or communication method.

Thus, the alarm message, e.g., a message containing the digital alarm signal and alarm data, is transmitted to an alarm signal server 34 at the alarm forwarding service 28. The cellular radio 6 at the home owner's or alarm system user's premises 2 is preprogrammed with the destination telephone number of the alarm signal server 34 so that each time an alarm message needs to be sent, the cellular radio 6 will do so, thus commencing the alarm process. The alarm signal server 34 will then send an acknowledgement message (ACK) of the alarm message back to the cellular radio 6 via the cellular network 10. The cellular radio 6 will receive this ACK signal, and initiate a cellular voice call to a predefined telephone number. The voice call can be transmitted via a voice communication or traditional circuit switched method, such as POTS, VOIP, cellular voice, etc.

The telephone number of the cellular radio 6 making the voice call is obtained using a caller-ID function at the Alarm Forwarding Service 28. In addition, the alarm signal server 34 will notify the dialer bank 32 which will contact the PABX 30 to connect to the PABX 18 at the central station 12 further connecting the call to the alarm receiver 14. Hence, the voice call from the cellular radio 6 to the predefined telephone number will be directed to the PABX 30 at the Alarm Forwarding Service 28. The PABX 30 will conference the voice call into the open alarm signaling call placed by the dialer bank 32. The PBX 18 and Automation Server 16 will route the voice call to the central station operator telephone 20.

The PBX 18 of the central station 12 connects to a telephone device 20 operated by an operator at the central station 12. In addition, the alarm data that was originally sent via the alarm message is forwarded to an operator's computer terminal 22, which is operated by the operator who receives the telephone call from the premises 2. Thus, the operator will have the alarm data or condition appear on his or her display terminal 22 screen and will also receive the voice call being placed by the cellular radio 6 from the premises 2. Upon answering the voice call, the operator may begin speaking with a person at the premises 2 to determine if conditions are safe, or if security or other personnel should be dispatched. Note that the telephone functions may be integrated with the computer terminal 22 as is well known in the art.

The procedure for the first embodiment is shown in FIG. 3, in accordance with the system shown in FIGS. 1 and 2. Initially, in step S1, an alarm event occurs, and, in step S2, the cellular radio 6 sends the alarm message, using a data transmission method. The alarm signal server 34 at the alarm forwarding service 28 receives the alarm in step S3. In step S4, the alarm signal server 34 calls the central station 12 using, for example, a POTS re-dialer, and sends the alarm to the alarm receiver 14 at the central station 12.

In step S5, the alarm forwarding service 28 acknowledges the alarm by sending the ACK signal back to the cellular radio 6, using a data transmission method. In step S6, the cellular radio 6 calls its predefined telephone number or "hot line", using a voice communication or transmission method. The alarm forwarding service 28 creates a three-way call, in step S7, between the re-dialer, the cellular radio 6 and the central station 12 using the caller-ID to identify the incoming voice call. Based on this caller ID, the operator recognizes the line provided with the alarm message or dispatch, and picks up or answers this line. In step S8, a two-way voice conversation is initiated, and at the same time, the alarm message is displayed on the operator's screen, thus completing the procedure.

Figure 4:
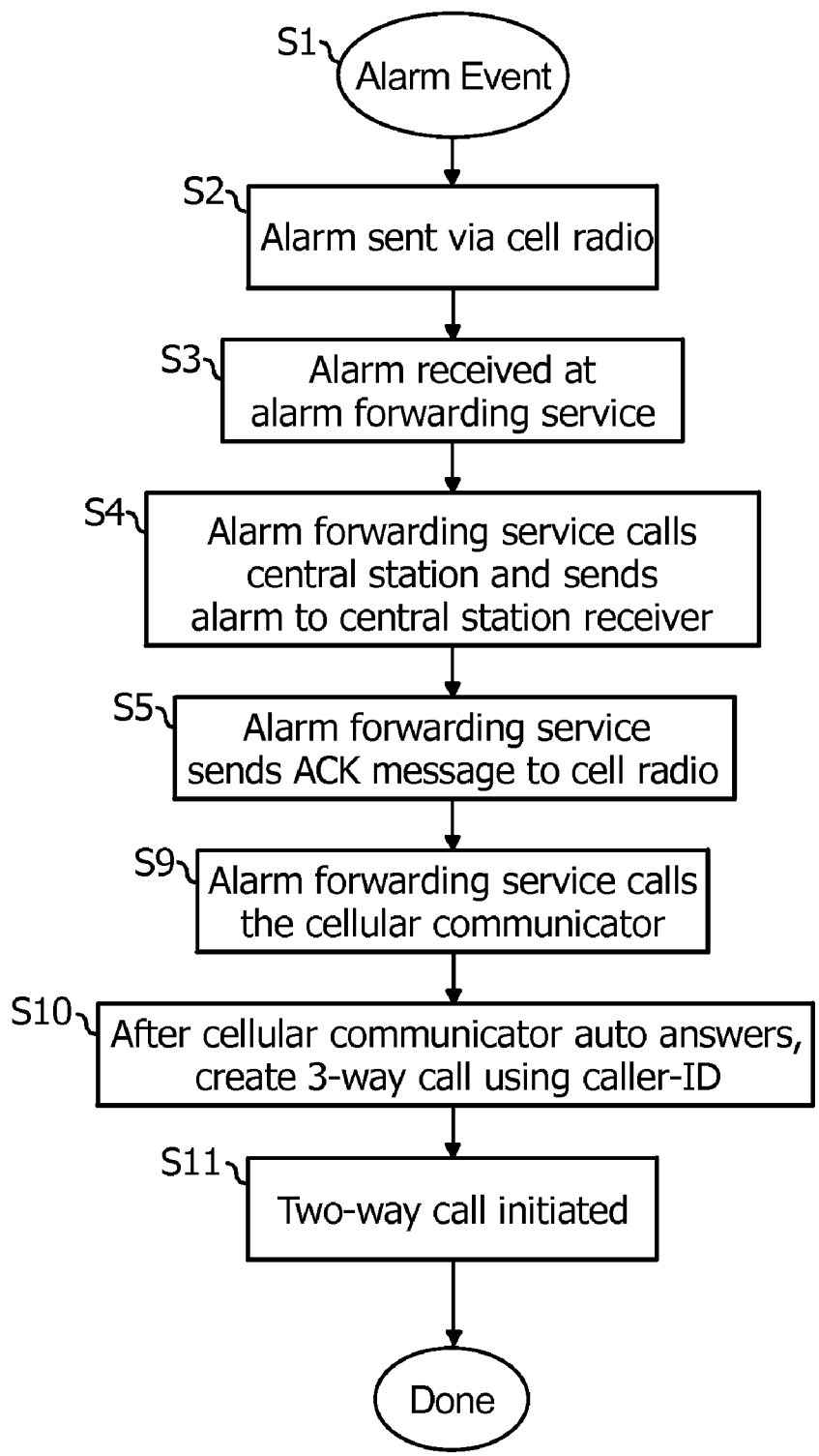
FIG. 4 is a flowchart of the steps carried out by the second embodiment of the present invention.

A second embodiment of the inventive system is described, also in accordance with the system shown in FIGS. 1 and 2. The procedure for the second embodiment is shown in FIG. 4. In this embodiment, the alarm forwarding service 28 contacts the cellular radio 6 instead of the cellular radio 6 maintaining a "hot line" number that it calls after transmitting an alarm signal. Accordingly, the procedure for the second embodiment is as follows.

The initial steps of the second embodiment, i.e., steps S1-S5, are the same as in the first embodiment. In step S9, within a prescribed time of receiving the alarm at step S3, the alarm forwarding service 28 would transmit a message which would be auto-answered by the cellular radio 6. The prescribed time could be, for example, two minutes. In step S10, after the cellular radio 6 auto-answers the call, the alarm forwarding service 28 creates a three-way call between the re-dialer, the cellular radio 6 and the central station 12. For example, the PBX 30 could be instructed to conference the outbound central service alarm delivery call with the outbound voice call.

In step S11, a two-way voice conversation is initiated, and at the same time, the alarm message is displayed on the operator's screen, thus completing the procedure. For example, the operator recognizes the line provided with the alarm message or dispatch, and picks up or answers this line, initiating this voice conversation.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for using caller identification for providing alarm notification and two-way voice communication for a hybrid data/voice system, said method comprising:
    sending an alarm notification from a remote communication device to an alarm forwarding service using a data transmission method;
    the alarm forwarding service recognizing an identification of the remote communication device;
    the alarm forwarding service using said identification to create a three-way call among the alarm forwarding service, the remote communication device and a central station voice receiver using a voice transmission method; and
    initiating a two-way voice communication between said remote communication device and a central station voice receiver using a voice transmission method.

2. The method according to claim 1, wherein said data transmission method is one of cellular transmission protocol and internet protocol.

3. The method according to claim 1, wherein said voice transmission method is one of cellular transmission protocol and internet protocol.

4. The method according to claim 1, wherein the remote communication device is a cellular radio.

5. The method according to claim 1, wherein the remote communication device is an internet enabled communication device.

6. The method according to claim 1, wherein the identification of the remote communication device is recognized using a caller-identification function.

7. A method for providing alarm notification and two-way voice communication for a service based hybrid data/voice system, said method comprising:
   sending an alarm notification from a remote communication device to an alarm forwarding service using a data transmission method;
   the alarm forwarding service establishing a connection from said alarm forwarding service to said remote communication device;
   the alarm forwarding service using said connection to create a three-way call among the alarm forwarding service, the remote communication device and a central station voice receiver using a voice transmission method; and
   initiating a two-way voice communication between the remote communication device and the central station voice receiver using the voice transmission method.

8. The method according to claim 7, wherein said data transmission method is one of cellular transmission protocol and internet protocol.

9. The method according to claim 7, wherein said voice transmission method is one of cellular transmission protocol and internet protocol.

10. The method according to claim 7, wherein said remote communication device is a cellular radio.

11. The method according to claim 7, wherein said remote communication device is an internet enabled communication device.

12. The method according to claim 7, wherein said connection is established when said remote communication device auto-answers after a predetermined time.

* * * * *